(12) United States Patent
Blevins et al.

(10) Patent No.: US 9,574,147 B2
(45) Date of Patent: *Feb. 21, 2017

(54) BIOMASS HIGH EFFICIENCY HYDROTHERMAL REFORMER

(71) Applicant: RES USA, LLC, Westminster, CO (US)

(72) Inventors: Randy Blevins, West Des Moines, IA (US); Joshua B. Pearson, Lakewood, CO (US); Harold A. Wright, Longmont, CO (US)

(73) Assignee: RES USA, LLC, Commerce City, CO (US)

( * ) Notice: Subject to any disclaimer, the term of this patent is extended or adjusted under 35 U.S.C. 154(b) by 291 days.

This patent is subject to a terminal disclaimer.

(21) Appl. No.: 14/289,258

(22) Filed: May 28, 2014

(65) Prior Publication Data

US 2014/0261112 A1    Sep. 18, 2014

Related U.S. Application Data

(62) Division of application No. 13/111,836, filed on May 19, 2011, now Pat. No. 9,127,220.

(51) Int. Cl.
*C10J 3/30* (2006.01)
*C10J 3/80* (2006.01)
(Continued)

(52) U.S. Cl.
CPC ............... *C10J 3/485* (2013.01); *B01J 8/067* (2013.01); *B01J 19/242* (2013.01); *B01J 19/243* (2013.01); *B01J 19/2415* (2013.01); *B01J 19/2425* (2013.01); *C01B 3/346* (2013.01); *C10G 2/34* (2013.01); *C10J 3/30* (2013.01); *C10J 3/80* (2013.01); *F23G 5/033* (2013.01); *F23G 5/04* (2013.01); *F23G 5/444* (2013.01); *B01J 2208/00309* (2013.01); *B01J 2208/00504* (2013.01); *B01J 2219/00006* (2013.01); *B01J 2219/00157* (2013.01); *B01J 2219/00159* (2013.01); *B01J 2219/24* (2013.01);
(Continued)

(58) Field of Classification Search
CPC combination set(s) only.
See application file for complete search history.

(56) References Cited

U.S. PATENT DOCUMENTS 4,585,798 A    4/1986    Beuther et al.
4,609,679 A    9/1986    Wood et al.
(Continued)

OTHER PUBLICATIONS

Final Office Action dated Jul. 8, 2015 for corresponding U.S. Appl. No. 13/111,836 (7 pgs).

(Continued)

*Primary Examiner* — Kaity Handal
(74) *Attorney, Agent, or Firm* — Timothy S. Westby; Porter Hedges LLP (57) ABSTRACT

A mixing apparatus for producing a feedstock for a reformer, the mixing apparatus including at least one mixing vessel comprising a cylindrical vessel with a conical bottom; a steam inlet configured for introducing steam into the conical bottom; a carbonaceous material inlet configured for introducing a carbonaceous feed into the cylindrical vessel; and an outlet for a reformer feedstock comprising at least 0.3 pounds of steam per pound of carbonaceous material, with the at least one mixing vessel configured for operation at a pressure of greater than about 10 psig.

19 Claims, 4 Drawing Sheets

(51) Int. Cl.

| | | |
|---|---|---|
| *F23G 5/04* | (2006.01) | |
| *C10J 3/48* | (2006.01) | |
| *B01J 8/06* | (2006.01) | |
| *B01J 19/24* | (2006.01) | |
| *F23G 5/033* | (2006.01) | |
| *F23G 5/44* | (2006.01) | |
| *C01B 3/34* | (2006.01) | |
| *C10G 2/00* | (2006.01) | |

(52) U.S. Cl.
CPC ............... *C01B 2203/0216* (2013.01); *C01B 2203/0811* (2013.01); *C01B 2203/1241* (2013.01); *C10J 2200/09* (2013.01); *C10J 2300/0906* (2013.01); *C10J 2300/0909* (2013.01); *C10J 2300/0976* (2013.01); *C10J 2300/1246* (2013.01); *C10J 2300/1659* (2013.01); *C10J 2300/1687* (2013.01); *C10J 2300/1853* (2013.01); *Y02E 50/32* (2013.01)

(56) References Cited

U.S. PATENT DOCUMENTS

| | | |
|---|---|---|
| 5,036,032 A | 7/1991 | Iglesia et al. |
| 5,504,118 A | 4/1996 | Benham et al. |
| 5,508,118 A | 4/1996 | Hayashi et al. |
| 5,733,839 A | 3/1998 | Espinoza et al. |
| 6,075,062 A | 6/2000 | Zennaro et al. |
| 6,136,868 A | 10/2000 | Culross et al. |
| 6,262,131 B1 | 7/2001 | Arcuri et al. |
| 6,353,035 B2 | 3/2002 | Manzer et al. |
| 6,368,997 B2 | 4/2002 | Herron et al. |
| 6,451,864 B1 | 9/2002 | Wang et al. |
| 6,476,085 B2 | 11/2002 | Manzer et al. |
| 6,490,880 B1 | 12/2002 | Walsh |
| 6,537,945 B2 | 3/2003 | Singleton et al. |
| 6,558,634 B1 | 5/2003 | Wang et al. |
| 6,648,662 B2 | 11/2003 | Shinzou et al. |
| 7,084,180 B2 | 8/2006 | Wang et al. |
| 7,375,142 B2 | 5/2008 | Pearson |
| 2003/0105171 A1 | 6/2003 | Subramanian et al. |
| 2009/0062108 A1 | 3/2009 | Demirel et al. |
| 2009/0069451 A1 | 3/2009 | Demirel et al. |
| 2009/0075814 A1 | 3/2009 | Duvenhage et al. |
| 2009/0298678 A1 | 12/2009 | Demirel et al. |
| 2010/0181539 A1 | 7/2010 | Apanel et al. |
| 2010/0311570 A1 | 12/2010 | Duvenhage et al. |

OTHER PUBLICATIONS

Notice of Allowance dated Jul. 29, 2015 for corresponding U.S. Appl. No. 13/111,836 (5 pgs).
Office Action dated Jun. 20, 2014 for corresponding U.S. Appl. No. 13/111,836 (7 pgs.).

BIOMASS HIGH EFFICIENCY HYDROTHERMAL REFORMER

CROSS-REFERENCE TO RELATED APPLICATIONS

This application is a divisional application which claims the benefit under 35 U.S.C. §121 of U.S. patent application Ser. No. 13/111,836, filed May 19, 2011, the disclosure of which is hereby incorporated herein by reference.

STATEMENT REGARDING FEDERALLY SPONSORED RESEARCH OR DEVELOPMENT

Not Applicable.

BACKGROUND

Field of the Invention

This disclosure relates generally to the conversion of carbonaceous feedstock into synthesis gas. More specifically, this disclosure relates to a reforming apparatus for the conversion of carbonaceous feedstock to synthesis gas. Still more specifically, this disclosure relates to a high temperature, high efficiency reformer configured for production of synthesis gas from a reformer feedstock comprising at least one carbonaceous material.

Background of the Invention

Processes for the production of synthesis gas from carbonaceous materials utilize gasification of a feedstock comprising the carbonaceous materials in a so-called 'reformer' to produce a stream comprising synthesis gas (i.e. hydrogen and carbon monoxide; also known as 'syngas'). The product synthesis gas generally also comprises amounts of carbon dioxide and methane and may also comprise minor amounts of other components. Generation of synthesis gas is disclosed in numerous patents.

Synthesis gas produced via gasification of carbonaceous materials can be converted into other compounds in a so-called Fischer-Tropsch reaction. Fischer-Tropsch (FT) synthesis can be used to catalytically produce synthetic liquid fuels, alcohols or other oxidized compounds. FT synthesis occurs by the metal catalysis of an exothermic reaction of synthesis gas. Fischer-Tropsch (FT) technology can thus be utilized to convert synthesis gas to valuable products. Hydrocarbon liquid products of various Fischer-Tropsch processes are generally refined to produce a range of synthetic fuels, lubricants and waxes. Often, the Fischer-Tropsch process is performed in a slurry bubble column reactor (SBCR). The technology of converting synthesis gas originating from natural gas into valuable primarily liquid hydrocarbon products is referred to as Gas To Liquids (GTL) technology. When coal is the raw material for the syngas, the technology is commonly referred to as Coal-To-Liquids (CTL). Fischer-Tropsch technology is one of several conversion techniques included in the broader GTL/CTL technology. Desirably, the synthesis gas for subsequent production of valuable products via Fischer-Tropsch is produced from 'green' materials. For example, an environmentally-friendly system for the production of synthesis gas, which may subsequently be utilized to produce Fischer-Tropsch products, would desirably allow for the production of synthesis gas from carbonaceous materials, such as biomass, which may generally be considered waste materials.

The catalyst used in the reactor and to some extent the temperatures and pressures used, will determine what products can be obtained. Some Fischer-Tropsch processes are directed to the production of liquid hydrocarbons. Other Fischer-Tropsch processes are directed toward the production of alcohols. Depending on the subsequent downstream application for which the synthesis gas is produced, the reformer can be operated to provide synthesis gas having a desired molar ratio of hydrogen to carbon monoxide.

Accordingly, there is a need in the art for systems and methods for the production of synthesis gas from carbonaceous materials. Such systems and methods should preferably enable the environmentally-friendly production of synthesis gas, for example by allowing the use of sustainable and renewable feedstocks such as biomass, facilitating sequestration of carbon dioxide and/or reducing the amount of waste material produced.

SUMMARY

Herein disclosed is a mixing apparatus for producing a feedstock for a reformer, the mixing apparatus comprising: at least one mixing vessel comprising: a cylindrical vessel with a conical bottom; a steam inlet configured for introducing steam into the conical bottom; a carbonaceous material inlet configured for introducing a carbonaceous feed into the cylindrical vessel; and an outlet for a reformer feedstock comprising at least 0.3 pounds of steam per pound of carbonaceous material, with the at least one mixing vessel configured for operation at a pressure of greater than about 10 psig. In embodiments, the mixing apparatus further comprises one or more mixing vessel outlet lines fluidly connected with the reformer via a distributor, whereby the reformer feedstock can be introduced into a plurality of coiled tubes within the reformer.

In embodiments, the carbonaceous material inlet is located at or near the top of the cylindrical vessel. In embodiments, the at least one mixing vessel is configured for operation at a pressure of greater than or equal to about 45 psig.

The mixing apparatus may further comprise one or more feed preparation apparatus upstream of the at least one mixing vessel. The one or more feed preparation apparatus may comprise at least one component selected from the group consisting of sizing apparatus configured to provide a desired size of carbonaceous material for the carbonaceous feed, and drying apparatus configured to reduce the moisture content of a carbonaceous material for the carbonaceous feed. In embodiments, the mixing apparatus comprises sizing apparatus configured to provide carbonaceous material having a desired size. The sizing apparatus may be operable to provide carbonaceous material having a size in the range of from about 0.001 cm to about 2.54 cm. In embodiments, the sizing apparatus comprises at least one grinder and at least one separator configured to provide a carbonaceous material having an average particle diameter of less than about $3/16^{th}$ of an inch (0.47 cm). In embodiments, the mixing apparatus comprises drying apparatus configured to reduce the moisture content of a carbonaceous material for the carbonaceous feed. The drying apparatus may comprise a dryer operable to dry the carbonaceous material to a moisture content of less than or equal to about 20 weight percent.

In embodiments, the steam inlet is fluidly connected with a steam superheater operable to provide superheated steam. The steam superheater may be fluidly connected with the reformer, whereby a flue gas produced in the reformer can be utilized to produce superheated steam in the steam superheater. The reformer may be designed to produce the flue gas via combustion of a fuel comprising Fischer-Tropsch tailgas.

In embodiments, the mixing apparatus further comprises a spent catalyst recycle line designed for introduction of spent catalyst/conversion product from a catalytic synthesis gas conversion process directly into the at least one mixing vessel, the carbonaceous material inlet is fluidly connected with a spent catalyst recycle line designed for introduction of spent catalyst/conversion product from a catalytic synthesis gas conversion process, or both. The spent catalyst recycle line may be fluidly connected with a catalytic synthesis gas conversion apparatus configured to produce a product from synthesis gas produced in the reformer. In embodiments, the catalytic synthesis gas conversion apparatus comprises at least one Fischer-Tropsch reactor. The at least one Fischer-Tropsch reactor may contain an iron-based Fischer-Tropsch catalyst, and the spent catalyst/conversion product may comprise spent iron-based Fischer-Tropsch catalyst and Fischer-Tropsch hydrocarbons. In embodiments, the catalytic synthesis gas conversion apparatus comprises an alcohol synthesis reactor.

In embodiments, the outlet for the reformer feedstock is located at or near a bottom of the at least one mixing vessel.

BRIEF DESCRIPTION OF THE DRAWINGS

For a more detailed description of the preferred embodiment of the present invention, reference will now be made to the accompanying drawings, wherein.

NOTATION AND NOMENCLATURE

Certain terms are used throughout the following description and claims to refer to particular system components. This document does not intend to distinguish between components that differ in name but not function.

As used herein, the term 'carbonaceous feedstock' includes not only organic matter that is part of the stable carbon cycle, but also fossilized organic matter such as coal, petroleum, and natural gas, and products, derivatives and byproducts thereof such as plastics, petroleum coke and the like.

As used herein, the terms 'hot', 'warm', 'cool' and 'cold' are utilized to refer to the relative condition of various streams. That is, a 'hot' stream is at a higher temperature than a 'warm' stream, a 'warm' stream is likewise at a higher temperature than a 'cool' stream and a 'cool' stream is likewise at a higher temperature than a 'cold' stream. Such a stream may not 'normally be considered as such. That is a 'cool' stream may have a temperature that is actually high enough to be considered hot or warm in conventional, non-relative usage.

As used herein the term 'dry' as applied to a carbonaceous feed material is used to indicate that the feed material has a moisture content suitable for reforming, e.g. less than about 20 weight percent, and not to imply the complete absence of moisture.

DETAILED DESCRIPTION

I. Overview. Herein disclosed are a high temperature, high efficiency, biomass reformer, a mixing apparatus, a synthesis gas production system comprising same and a method of producing synthesis gas from at least one carbonaceous material. The disclosed high temperature, high efficiency, reformer is configured for the production of synthesis gas from renewable and sustainable carbonaceous materials such as biomass. Accordingly, the disclosed bioreformer, the disclosed synthesis gas production system comprising the bioreformer and the disclosed process for producing synthesis gas therewith represent clean technologies. Such a reformer is significantly more environmentally-friendly than conventional reformers that produce synthesis gas from other sources, such as from natural gas.

Figure 1:
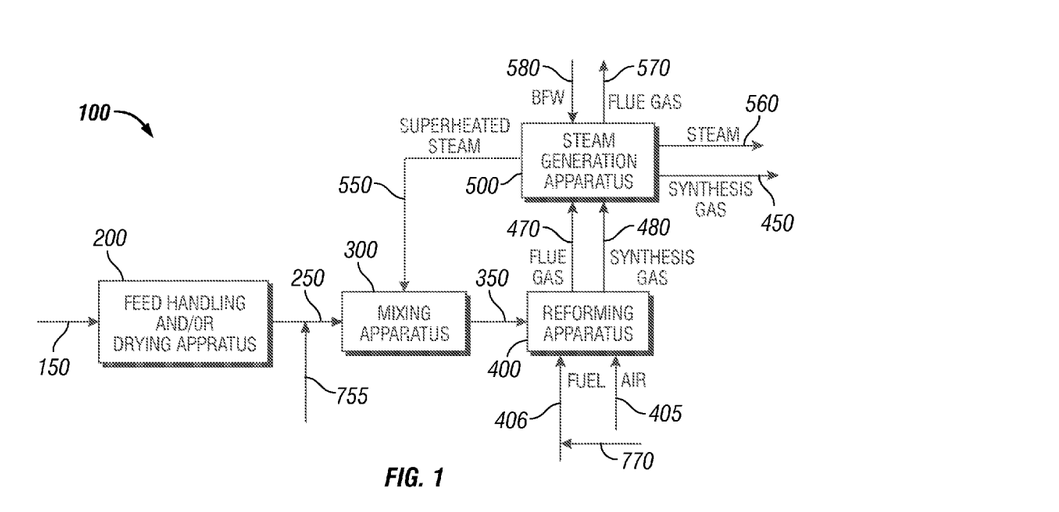
FIG. 1 is a schematic of a synthesis gas production system according to an embodiment of this disclosure, the production system or biorefinery comprising a high efficiency, hydrothermal reformer and suitable for carrying out the production of synthesis gas conversion products.

II. Synthesis Gas Production System. FIG. 1 is a schematic of a synthesis gas production system 100 according to this disclosure. Synthesis gas production system 100 comprises reformer 400 and mixing apparatus 300. As discussed further hereinbelow, synthesis gas production system 100 can further comprise feed handling and/or drying apparatus 200, steam generation apparatus 500 or both. Each of the component apparatus will be described in more detail hereinbelow.

High Temperature, High Efficiency Biomass Reformer 400. System 100 comprises reforming apparatus 400, also referred to herein as biomass reformer 400. Description of reforming apparatus 400 will now be made with reference to FIG. 2, which is a schematic of a synthesis gas production system 100A comprising mixing apparatus 300A, reformer 400A and steam generation apparatus 500A, according to an embodiment of this disclosure and FIG. 3, which is a schematic of a synthesis gas production system 100B comprising mixing apparatus 300B, reformer 400B and steam generation apparatus 500B, according to another embodiment of this disclosure.

Figure 2:
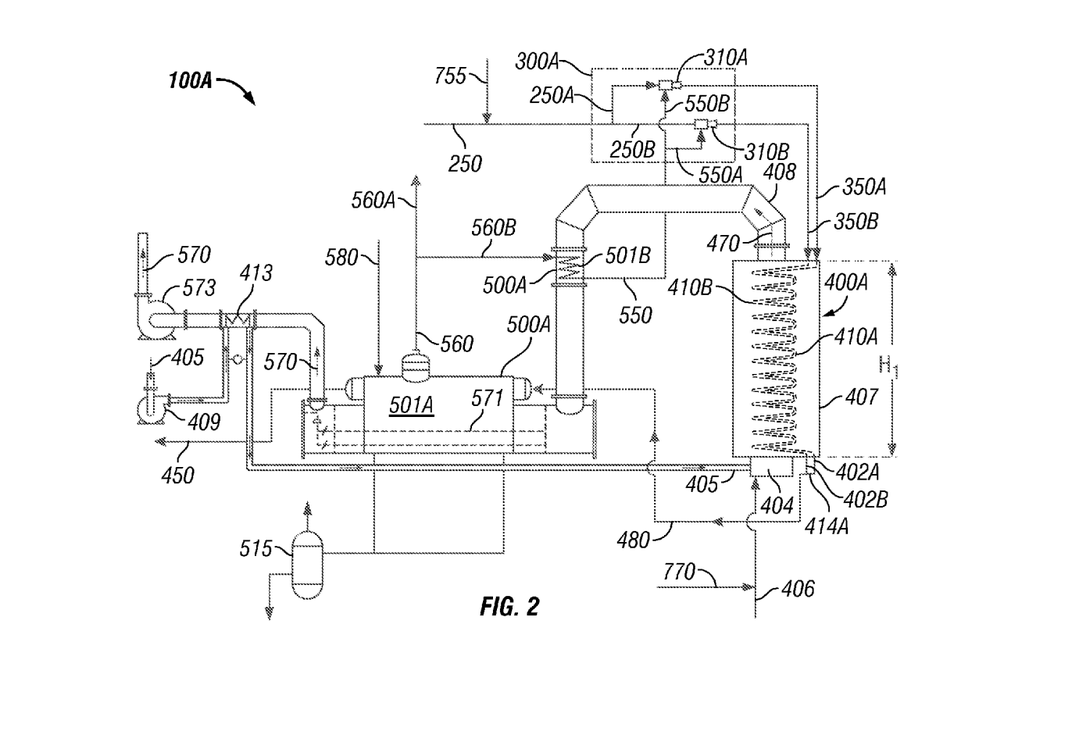
FIG. 2 is a schematic of a synthesis gas production system according to another embodiment of this disclosure.

Reformer 400A is a high temperature, high efficiency reformer. In embodiments, reformer 400 is a biomass reformer. Reformer 400A comprises a plurality of coiled tubes 410A, 410B surrounded by enclosure, cylindrical vessel or firebox 407. In embodiments, biomass reformer 400A is a cylindrical vessel. In embodiments, the cylindrical vessel 407 has a height H1 in the range of from about 40 feet (12.2 m) to about 100 feet (30.5 m), from about 50 feet (15.2 m) to about 100 feet (30.5 m), or from about 60 feet (18.3 m) to about 100 feet (30.5 m). In embodiments, coiled tubes 410 have an inside diameter (ID) of at least or about 2 inches (5.1 cm), at least or about 3 inches (7.6 cm), or at least or about 4 inches (10.2 cm). Coiled tubes 410 may be configured as cylindrical helices and may be oriented vertically within cylindrical vessel 407. In embodiments, each of the coiled tubes 410 has a total length or coil length that is at least 4, 5, 10, 15, 20 or 25 times the vertical height of the coiled tubes. In embodiments, each of the coiled tubes 410 has a total length in the range of from about 200 feet (61 m) to about 1000 feet (304.8 m), from about 400 feet (121.9 m) to about 800 feet (243 m), or from about 400 feet (121.9 m) to about 700 feet (213.4 m).

In embodiments, the metallurgy of the coiled tubes is upgraded such that the tubes are operable at the high temperatures of operation of a high temperature reformer. A 'high' temperature reformer is operable at a temperature of at least 1093° C. (2000° F.). In embodiments, the coiled tubes are operable at temperatures up to 926° C. (1700° F.), 982° C. (1800° F.), 1038° C. (1900° F.), 1093° C. (2000° F.), 1149° C. (2100° F.) and a pressure of at least 2 psig (13.8 kPa), 5 psig (34.5 kPa), at least 20 psig (137.9 kPa), greater than or about 40 psig (275.8 kPa) or about 45 psig (310.3 kPa) or about 50 psig (344.7 kPa). In embodiments, the coiled tubes are fabricated from stainless steel, such as 310 stainless steel. In embodiments, the coiled tubes are fabricated from austenitic nickel-chromium-based superalloys or other high temperature alloys that are resistant to hydrogen attack and suitable for production of coiled helices, such as INCONEL™. In embodiments, the coiled tubes are fabricated from INCONEL™ 800 HT. In embodiments, the coiled tubes are designed to provide at least 100,000 hours of operation.

Figure 3:
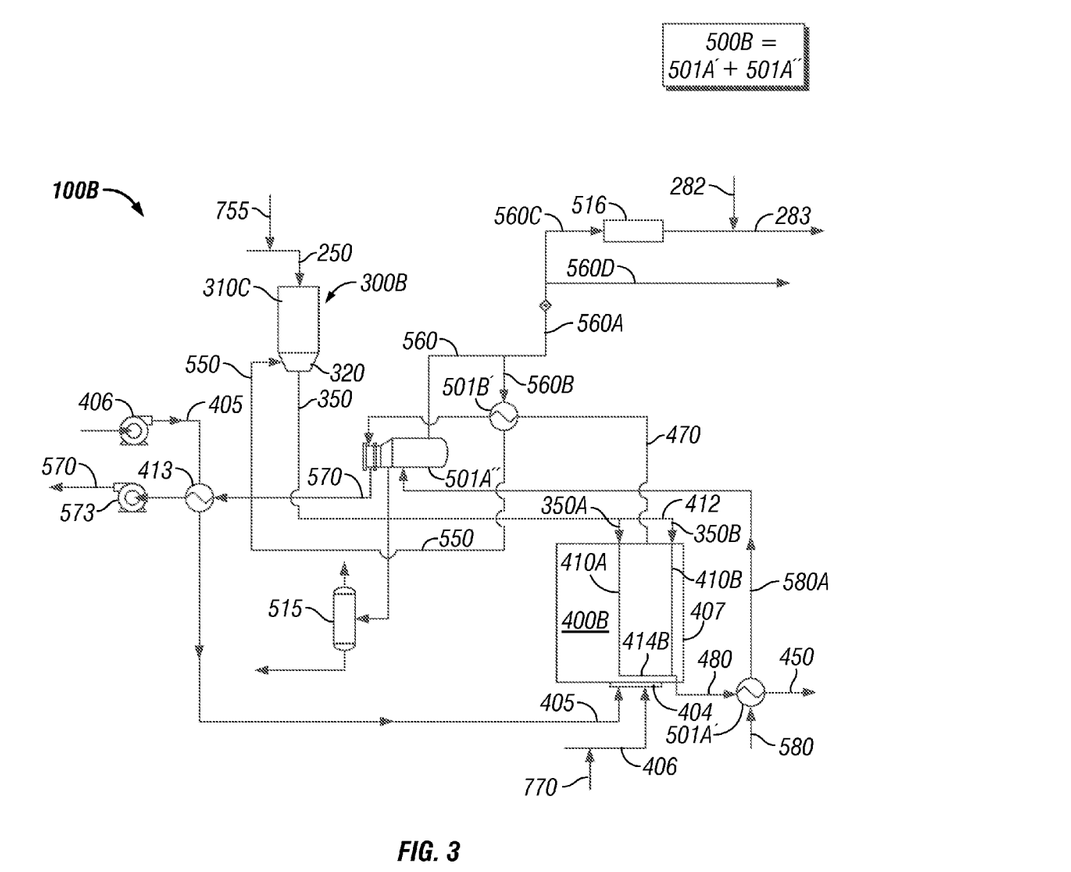
FIG. 3 is a schematic of a synthesis gas production system according to another embodiment of this disclosure.

As shown in FIG. 3, a distributor or flow divider 412 can be positioned external or internal to firebox 407 for distributing a reformer feedstock comprising a mixture of cooled steam and dry carbonaceous material to the plurality of coiled tubes 410. In embodiments, distributor 412 is positioned external to vessel 407. In embodiments, distributor 412 is configured to provide substantially equal amounts of the reformer feed mixture to each of the coiled tubes 410.

Distributor 412 distributes reformer feed mixture to each of the plurality of coiled tubes 410 (410A and 410B indicated in the embodiment of FIG. 3) via one or more reformer feed inlet lines 350 (350A and 350B depicted in the embodiment of FIG. 3). In embodiments, mixing apparatus 300 (300A in FIG. 2; 300B in FIG. 3), further discussed hereinbelow, comprises a plurality of feed mixers 310 (mixers 310A and 310B depicted in FIG. 2; mixer 310C depicted in FIG. 3), the output of each of which is fed via one or more reformer feed inlet lines 350 (350A and 350B indicated in the embodiment of FIG. 2) into the coiled tubes 410.

The amount of superheated steam in the reformer feed mixture is a function of the nature of the carbonaceous material (i.e. the feedstock) used. Steam provides the additional hydrogen necessary to produce, from the feedstock, suitable synthesis gas for subsequent production of liquid hydrocarbons, alcohols and/or other oxidized compounds, or other synthesis gas conversion products therefrom. In terms of the stoichiometric ratio of carbon to hydrogen in lower alcohols such as methanol and ethanol and $C^{5+}$ hydrocarbons, the dry feedstock may have a stoichiometric excess of carbon relative to hydrogen. Thus water, either trapped in the feedstock or in the form of superheated steam, or both, can serve to provide additional hydrogen to maximize subsequent production of synthesis gas conversion products. In embodiments, prior to mixing, the feedstock is relatively dry, and sufficient water is provided by combining superheated steam with the dried feedstock material in mixing apparatus 300, as discussed hereinbelow.

In embodiments, from about 0.09 kilograms (0.2 pounds) to about 0.45 kilograms (1 pound), from about 0.14 kg (0.3 pounds) to about 0.32 kg (0.7 pounds) or from about 0.14 kg (0.3 pounds) to about 0.27 kg (0.6 pounds) of steam is added per pound of 'dry' feedstock comprising from about 4% to about 20% moisture, from about 9% to about 18% moisture or from about 12% to about 18% moisture, to provide the reformer feed mixture that is introduced into the coiled tubes of the reformer. The reformer feed mixture can have a total water to feedstock ratio in the range of from about 0.2 to 1.0, from about 0.3 to about 0.7 or from about 0.3 to about 0.6.

Feedstock reformation carried out in the feedstock reformer is endothermic. Thus, reforming apparatus 400 comprises one or more burners 404 operable to provide the necessary heat of the pyrolysis, reforming and/or gasification reaction(s) occurring within the coiled tubes 410 by combusting fuel in the presence of oxygen.

Burners 404 are desirably positioned at or near the bottom of the reformer. Burners 404 may be positioned internal or external to firebox 407. In embodiments, burner(s) 404 are internal to firebox 407. The burner(s) 404 may be distributed substantially uniformly along the diameter of vessel 407. In embodiments, the reformer has from about 1 to about 10 burners, from about 1 to about 4 burners, or from about 1 to about 3 burners. Oxidant utilized by the burner(s) may be provided as air, enriched air, or substantially pure oxygen. For example, in the embodiment of FIG. 2, each of the burners 404 is provided with air via one or more air inlet lines 405 and fuel provided via one or more fuel inlet lines 406. The oxidant and fuel may be fed separately to each burner 404 or combined prior to entry thereto. The system can further comprise a forced draft (FD) fan 409 configured to provide air to an air preheater 413 configured to raise the temperature of the inlet air from a first temperature (e.g. ambient temperature) to a temperature in the range of from about −18° C. (0° F.) to about 399° C. (750° F.), from about 38° C. (100° F.) to about 399° C. (750° F.) or from about 316° C. (600° F.) to about 399° C. (750° F.). In embodiments, flue gas exiting steam generation apparatus 500A (discussed further hereinbelow) is utilized to heat the air upstream of burner(s) 404. The air may be preheated by heat transfer with a flue gas stream in steam generator flue gas outlet line(s) 570 exiting steam generator 501A. This flue gas may have a temperature in the range of from about 649° C. (1200° F.) to about 1260° C. (2300° F.), from about 760° C. (1400° F.) to about 1204° C. (2200° F.) or from about 871° C. (1600° F.) to about 1149° C. (2100° F.).

Fuel is provided to the one or more burners 404 via fuel inlet line(s) 406. Any fuel known in the art can be utilized. In embodiments, the fuel provided to the reformer is selected from the group consisting of methane (e.g. natural gas), synthesis gas (e.g. excess synthesis gas), tailgas (e.g. Fischer-Tropsch tailgas) and combinations thereof. In embodiments, one or more of the burners 404 may be specially designed for burning tailgas in line 770 or a mixture of tailgas with at least one other gas such as methane or synthesis gas. The amount of air combined with the fuel will be adjusted as known in the art based upon the fuel utilized and the desired temperature within the reformer. In embodiments, the reformer temperature is maintained at a temperature of at least about 926° C. (1700° F.), 982° C. (1800° F.), 1038° C. (1900° F.), 1093° C. (2000° F.) or 1149° C. (2100° F.).

For greater energy independence of the overall system, excess synthesis gas can be made and used to run a turbine and generate electricity to power the compressors and other electrically driven devices.

The reformer comprises one or more reformer flue gas outlet lines 470 for flue gas exiting the reformer. Desirably, reformer flue gas outlet line(s) 470 is positioned at or near the top of the reformer. In the embodiment of FIG. 2, reformer flue gas outlet lines 470 are provided a manifold 408 fluidly connecting reformer 400A with steam generation apparatus 500A. The flue gas exiting reformer 400A can have a temperature in the range of at least 926° C. (1700° F.), 982° C. (1800° F.), 1038° C. (1900° F.), 1093° C. (2000° F.), 1149° C. (2100° F.). The pressure of the flue gas can be in the range of from about −20 inches $H_2O$ to 0 inch $H_2O$; from about −16 inches $H_2O$ to −2 inches $H_2O$; or from about −15 inches $H_2O$ to −5 inches $H_2O$. In embodiments, the reformer is configured for operation at a pressure of greater than or equal to 5 psig (34.5 kPa), 30 psig (206.8 kPa), 40 psig (275.8 kPa), 45 psig (310.3 kPa) or 50 psig (344.7 kPa). Operation of the reformer at higher pressures may allow a reduction in the number of compression stages required upstream of a synthesis gas conversion apparatus and/or a reduction in required compression horsepower.

Superheated steam from line(s) 550 carries the feedstock to the reformer. In the process of heating up the feedstock upon mixing therewith, the steam may cool to a temperature in the range of from about 150° F. (66° C.) to about 1000° F. (538° C.), from about 200° F. (93° C.) to about 750° F. (399° C.), or from about 300° F. (149° C.) to about 400° F. (204° C.). In the process of heating up the feedstock upon mixing therewith, the steam may cool to a temperature of approximately 204° C. (400° F.) as the reformer feed mixture approaches the reformer. In embodiments, the inlet temperature of the reformer feed mixture entering the reformer is at a temperature of about 204° C. (400° F.). The exit temperature of the synthesis gas leaving the reformer can be in the range of from about 870° C. (1600° F.) to about 1205° C. (2200° F.) or from about 895° C. (1650° F.) to about 930° C. (1700° F.). In embodiments, the reformer is operated at a pressure of from about 34.5 kPa (5 psig) to about 275.8 kPa (40 psig).

Within the coiled tubes of the reformer, the carbonaceous materials in the reformer feed are anaerobically reformed with superheated steam to produce a product process gas comprising synthesis gas (hydrogen and carbon monoxide). The process gas can further comprise other components, for example, methane, carbon dioxide, and etc. Minor amounts of other ingredients may be formed. The reformer can comprise an internal (see 414B in FIG. 3) or external (see 414A in FIG. 2) manifold configured to combine the process gas from each of the coiled tubes 410 into one or more reformer process gas outlet lines 480. As indicated in the embodiment of FIG. 2, outlet lines 402 associated with each of the coiled tubes can be combined via manifold 414A to provide process gas to reformer process gas outlet line 480. In embodiments, the reformer is configured to provide temperature, pressure and residence time conditions suitable to provide a process gas comprising synthesis gas having a desired molar ratio of $H_2$ to CO. In embodiments, the reformer is configured to provide a synthesis gas having a $H_2$:CO molar ratio in the range of from about 0.7:1 to about 2:1, from about 0.7:1 to about 1.5:1 or about 1:1. In embodiments, the reformer is configured to provide a residence time within the reformer in the range of from about 0.3 s to about 3 s, from about 0.3 s to about 2 s, from about 0.3 s to about 1 s, or from about 0.4 s to about 0.6 s.

For any given feedstock, a desired composition of the resulting process gas (i.e. the proportions of hydrogen, carbon dioxide, carbon monoxide and methane) can be provided by adjusting the contact time in the reformer, the temperature at the reformer outlet, the amount of steam introduced with the feed, and to a lesser extent, the reformer pressure. In embodiments, the synthesis gas is to be utilized downstream for the production of liquid hydrocarbons via Fischer-Tropsch conversion. In embodiments, the synthesis gas is to be utilized downstream for the production of liquid hydrocarbons via Fischer-Tropsch conversion with an iron-based catalyst. In such embodiments, the system may be operated with a reformer exit temperature in the range of from about 898° C. (1650° F.) to about 926° C. (1700° F.) and a residence or contact time that is in the range of from about 0.3 seconds to about 2.0 seconds in the reformer. The contact or residence time can be calculated by dividing the internal volume of the reformer by the flow rate of the process gas exiting the reformer.

Mixing Apparatus 300. As indicated in FIG. 1, the synthesis gas production apparatus of this disclosure further comprises mixing apparatus 300 upstream of reformer 400. Mixing apparatus 300 is configured to combine feedstock introduced thereto via feedstock inlet line 250 with superheated steam introduced thereto via superheated steam line 550. As discussed further hereinbelow, the feedstock can be provided via feedstock handling and/or drying apparatus 200 positioned upstream of mixing apparatus 300. As discussed further hereinbelow, superheated steam can be provided via steam generation apparatus 500 configured to utilize the heat from the reformer flue gas and/or the reformer product gas to produce superheated steam from boiler feed water (BFW).

As depicted in the embodiment of FIG. 2, mixing apparatus 300A can comprise one or more mixers 310 (two mixers, 310A and 310B, indicated in FIG. 2) configured to combine superheated steam with feedstock material. Feedstock can be introduced into the mixing apparatus via one or more feedstock inlet lines 250. The feedstock comprises at least one carbonaceous material. In embodiments, the feedstock comprises biomass. The feedstock can comprise, by way of non-limiting examples, lignite, coal, red cedar, southern pine, hardwoods such as oak, cedar, maple and ash, bagasse, rice hulls, rice straw, weeds such as kennaf, sewer sludge, motor oil, oil shale, creosote, pyrolysis oil such as from tire pyrolysis plants, used railroad ties, dried distiller grains, corn stalks and cobs, animal excrement, straw, or some combination thereof. The hydrogen and oxygen content for the various materials differ and, accordingly, operation of the system (e.g. amount of superheated steam combined with the feedstock in the mixing apparatus, the reformer temperature and pressure, the reformer residence time) can be adjusted as known in the art to provide a process gas comprising synthesis gas having a suitable molar ratio of $H_2$:CO for a desired subsequent synthesis conversion application. The feedstock introduced into the mixing apparatus can have an average particle size in the range of from about 0.006 inch (0.015 cm) to about 0.3 inch (0.8 cm), from about 0.01 inch (0.025 cm) to about 0.25 inch (0.63 cm) or from about 0.1 inch (0.25 cm) to about 0.187 inch (0.5 cm). In embodiments, the feedstock introduced into the mixing apparatus has an average particle size in the range of from about 3.9E-5 inch (0.0001 cm) to about 1 inch (2.54 cm), from about 0.01 inch (0.0254 cm) to about 0.5 inch (1.27 cm) or from about 0.09 inch (0.24 cm) to about 0.2 inch (0.508 cm). In embodiments, the feedstock introduced into the mixing apparatus has an average particle size of less than about 0.01 inch (0.025 cm), less than about 0.25 inch (0.63 cm) or less than about 3/16 inch (0.476 cm). The feedstock introduced into the mixing apparatus can have a moisture content in the range of from about 4 weight percent to about 20 weight percent, from about 9 weight percent to about 18 weight percent, from about 5 weight percent to about 18 weight percent or from about 9 weight percent to about 15 weight percent. As discussed further hereinbelow and mentioned hereinabove, a system of this disclosure can further comprise, upstream of the mixing apparatus and connected therewith via one or more lines 250, feedstock handling and/or drying apparatus 200.

Within the mixing apparatus 300, feedstock is combined with superheated steam to provide a reformer feed mixture. In the embodiment of FIG. 2, feedstock in line 250 is divided via lines 250A and 250B and introduced into mixers 310A and 310B respectively. In embodiments, one or more spent catalyst recycle lines 755 is configured to directly or indirectly recycle at least a portion of a catalyst/conversion product (e.g. catalyst/wax or catalyst/alcohol) stream produced in a synthesis gas conversion apparatus to the reformer. Superheated steam, which may be produced via steam generation apparatus 500 as further described hereinbelow, is introduced via superheated steam lines 550, 550A and 550B to mixing apparatus 300A. In embodiments, the mixing apparatus is configured to combine the feedstock in feedstock line 250 with superheated steam having a temperature in the range of from about 400° F. (204.4° C.) to about 1000° F. (537.8° C.), from about 600° F. (315.6° C.) to about 950° F. (510° C.) or from about 400° F. (204.4° C.) to about 900° F. (482.2° C.) and/or a pressure in the range of from about 150 psig (1034.2 kPa) to about 400 psig (2757.9 kPa), from about 200 psig (1378.9 kPa) to about 375 psig (2585.5 kPa) or from about 250 psig (1723.7 kPa) to about 350 psig (2413.2 kPa). In embodiments, a system of this disclosure further comprises steam generation apparatus 500 configured to provide superheated steam for introduction into mixing apparatus 300 as further described hereinbelow.

In the embodiment of FIG. 2, superheated steam is introduced into each of the mixers 310A and 310B, respectively, via superheated steam lines 550A and 550B. The reformer feed mixture comprising feedstock and steam is introduced into the reformer via one or more reformer inlet lines 350. The feedstock/steam mixture from each mixer 310 may be introduced into a coiled tube 410. For example, in the embodiment of FIG. 2, feedstock/steam exiting mixers 310A and 310B via lines 350A and 350B, respectively, are introduced into coiled tubes 410A and 410B, respectively. In the embodiment of FIG. 3, the feedstock/steam mixture exiting mixing vessel 310C of system 100B is introduced via line 350, reformer feed distributor 412 and feed inlet lines 350A and 350B into coiled tubes 410A and 410B, respectively. Other combinations of number of mixers, manifolding of the outlets thereof, and distributors are envisioned and not beyond the scope of this disclosure.

As indicated in FIG. 3, the mixing vessel 310C can be a cylindrical vessel having a conical bottom 320. In embodiments, superheated steam is introduced at or near the bottom or into a conical section 320 at or near the bottom of the mixer. Feedstock may be introduced, in embodiments, at or near the top of the mixer. In embodiments, the mixture exits out the bottom of the mixing vessel.

In embodiments, the mixing vessel(s) (310A/310B/310C) are pressure vessels configured for operation at a pressure in the range of from about 5 psig (34.5 kPa) to about 50 psig (344.7 kPa), from about 30 psig (206.8 kPa) to about 50 psig (344.7 kPa), from about 45 psig (310.3 kPa) to about 50 psig (344.7 kPa), or configured for operation at or greater than about 30 psig (206.8 kPa), 45 psig (310.3 kPa) or 50 psig (344.7 kPa). In embodiments, the mixing vessels are configured for operation at a temperature in the range of from about 150° F. (66° C.) to about 1000° F. (538° C.), from about 200° F. (93° C.) to about 750° F. (399° C.), or from about 300° F. (149° C.) to about 400° F. (204° C.).

The mixing apparatus may be configured to provide a reformer feed mixture by combining from about 0.3 pound of steam per pound of feedstock to about 0.4, 0.5, 0.6, 0.7, 0.8, 0.9 or 1 pound of superheated steam per pound of feedstock. In embodiments, the mixing apparatus is configured to provide a reformer feed mixture by combining less than or equal to about 1, 0.9, 0.8, 0.7, 0.6, 0.5 or less than or equal to about 0.4 pound of superheated steam per pound of feedstock.

As indicated in FIG. 3 and discussed further hereinbelow, a portion of the saturated steam exiting the steam generator via one or more steam generator steam outlet line(s) 560 can be sent via one or more line(s) 560A and 560C to an excess steam condenser 516. Condensate from excess steam condenser 516 can be combined with condensate from elsewhere in the system (for example, with condensate in condensate outlet line 282 from a dryer air preheater of feed handling and/or drying apparatus 200, as discussed further hereinbelow). Condensate can be collected for disposal and/or recycle and reuse via line 283.

Steam Generation Apparatus 500. The synthesis gas production system disclosed herein may further comprise steam generation apparatus 500 configured to provide superheated steam for reforming feedstock within reformer 400/400A/400B. As depicted in the embodiment of FIG. 1, water (e.g. boiler feed water or BFW) is introduced into steam generation apparatus 500 via one or more BFW inlet lines 580, 'hot' reformer flue gas is introduced into steam generation apparatus 500 via one or more reformer flue gas outlet lines 470, 'hot' product process gas is introduced into steam generation apparatus 500 via one or more reformer process gas outlet lines 480, superheated steam exits steam generation apparatus 500 via one or more superheated steam outlet lines 550, saturated steam exits steam generation apparatus 500 via one or more steam generator steam outlet lines 560, 'cool' flue gas exits steam generation apparatus 500 via one or more steam generator flue gas outlet lines 570 and 'cool' process gas exits steam generation apparatus 500 via one or more steam generator process gas outlet lines 450.

Description of a suitable steam generation apparatus will now be made with reference to FIG. 2. In the embodiment of FIG. 2, steam generation apparatus 500A comprises reformer flue gas and reformer effluent steam generator 501A and steam superheater 501B. Reformer flue gas and reformer effluent steam generator 501A is configured to produce saturated steam by heat transfer from the 'hot' reformer effluent process gas and the 'warm' reformer flue gas exiting steam superheater 501B. Reformer effluent process gas is introduced into reformer flue gas and reformer effluent steam generator 501A via reformer process gas outlet line(s) 480. The 'hot' process gas introduced into reformer flue gas and reformer effluent steam generator 501A via reformer process gas outlet line(s) 480 may have a temperature in the range of from about 870° C. (1600° F.) to about 1205° C. (2200° F.) or from about 895° C. (1650° F.) to about 930° C. (1700° F.). In embodiments, the 'hot' process gas has a pressure in the range of from about 34.5 kPa (5 psig) to about 275 KPa (40 psig). Within reformer flue gas and reformer effluent steam generator 501A, steam is commonly generated from the flue gas and the process gas, although the two gases are not mixed. 'Cool' reformer process gas leaves reformer flue gas and reformer effluent steam generator 501A via steam generator process gas outlet line(s) 450. The 'cool' process gas exiting reformer flue gas and reformer effluent steam generator 501A via steam generator process gas line(s) 450 may have a temperature in the range of from about 400° C. (752° F.) to about 800° C. (1472° F.), from about 400° C. (752° F.) to about 600° C. (1112° F.) or about 400° C. (752° F.) and/or a pressure in the range of from about 5 psig (34.5 kPa) to about 50 psig (344.7 kPa), from about 10 psig (68.9 kPa) to about 40 psig (275.8 kPa) or from about 20 psig (137.9 kPa) to about 30 psig (206.8 kPa).

Reformer flue gas is introduced into reformer flue gas and reformer effluent steam generator 501A via reformer flue gas outlet line(s) 470. The 'hot' flue gas introduced into reformer flue gas and reformer effluent steam generator 501A via reformer flue gas outlet line(s) 470 may have a temperature in the range of from about 530° F. (276.7° C.) to about 1500° F. (815.6° C.), from about 530° F. (276.7° C.) to about 1200° F. (648.9° C.) or about 530° F. (276.7° C.) and/or a pressure in the range of from about −20 inches $H_2O$ to 0 inches $H_2O$; from about −15 inches $H_2O$ to about −5 inches $H_2O$; or from about −10 inches $H_2O$ to about −5 inches $H_2O$. As depicted in FIG. 2, in embodiments the reformer flue gas passes through steam superheater 501B, as discussed further hereinbelow, prior to introduction into reformer flue gas and reformer effluent steam generator 501A. In such instances, the 'warm' flue gas introduced into the reformer flue gas and reformer effluent steam generator 501A may have a temperature in the range of from about 1350° F. (732.2° C.) to about 2050° F. (1121.1° C.), from about 1450° F. (787.8° C.) to about 1950° F. (1065.6° C.) or from about 1350° F. (732.2° C.) to about 1850° F. (1010° C.) and/or a pressure in the range of from about −20 inches $H_2O$ to 0 inch $H_2O$; −16 inches $H_2O$ to −5 inches $H_2O$; −15 inches $H_2O$ to 5 inches $H_2O$. In embodiments, the temperature of the 'warm' flue gas is about 150 degrees less than that of the 'hot' flue gas, i.e. the flue gas temperature drop across steam superheater 501B is in the range of from about 130-170 degrees, from about 140-160 degrees, or about 150 degrees.

'Cool' reformer flue gas leaves reformer flue gas and reformer effluent steam generator 501A via steam generator flue gas outlet line(s) 570. The 'cool' flue gas exiting reformer flue gas and reformer effluent steam generator 501A via steam generator flue gas outlet line(s) 570 may have a temperature in the range of from about 50° F. (10° C.) to about 400° F. (204.4° C.), from about 200° F. (93.3° C.) to about 400° F. (204.4° C.) or about 400° F. (204.4° C.) and/or a pressure in the range of from about −20 inches $H_2O$ to about 20 inches $H_2O$; from about −16 inches to about 20 inches $H_2O$; or from about −15 inches $H_2O$ to about −10 inches $H_2O$. Induced draft (ID) fan 573 can serve to draw 'cool' reformer flue gas exiting reformer flue gas and reformer effluent steam generator 501A via steam generator flue gas outlet line(s) 570 through air preheater 413, discussed hereinabove. Heat transfer to the air within air preheater 413 may provide a 'cold' flue gas for use elsewhere in the system, for example in a dryer air heater of a feed handling and/or drying apparatus 200, as further discussed hereinbelow. The 'cold' flue gas passing out of air preheater 413 in line(s) 570 may have a temperature in the range of from about −18° C. (0° F.) to about 399° C. (750° F.), from about 38° C. (100° F.) to about 399° C. (750° F.) or about 316° C. (600° F.) to about 399° C. (750° F.) and/or a pressure in the range of from about −20 inches $H_2O$ to about 20 inches $H_2O$; from about −16 inches to about 20 inches $H_2O$; or from about −15 inches $H_2O$ to about −10 inches $H_2O$.

One or more steam generator steam outlet lines 560 carries steam (e.g. saturated steam) from reformer flue gas and reformer effluent steam generator 501A. A portion of the saturated steam may be directed via one or more steam export lines 560A for export to another apparatus or use elsewhere in the system. As indicated in the embodiment of FIG. 2, all or a portion of the saturated steam produced in reformer flue gas and reformer effluent steam generator 501A can be directed to steam superheater 501B configured to produce superheated steam. Steam superheater 501B is configured to provide superheated steam at a temperature in the range of from about 400° F. (204.4° C.) to about 1000° F. (537.8° C.), from about 600° F. (315.6° C.) to about 950° F. (510° C.) or from about 400° F. (204.4° C.) to about 900° F. (482.2° C.) and/or a pressure in the range of from about 150 psig (1034.2 kPa) to about 400 psig (2757.9 kPa), from about 200 psig (1379 kPa) to about 375 psig (2585.5 kPa) or from about 250 psig (1723.7 kPa) to about 350 psig (2413.2 kPa). In embodiments, steam superheater 501B operates via heat transfer from the 'hot' reformer flue gas in reformer flue gas outlet line(s) 470. Steam superheater 501B may be configured on a manifold or header 408 comprising reformer flue gas outlet(s) 470. As mentioned hereinabove, the 'warm' flue gas exiting the steam superheater may have a temperature in the range of from about 1500° F. (815.6° C.) to about 2200° F. (1204.4° C.), from about 1600° F. (871.1° C.) to about 2150° F. (1176.7° C.) or from about 1600° F. (871.1° C.) to about 2100° F. (1148.9° C.) and/or a pressure in the range of from about −20 inches $H_2O$ to 0 inches $H_2O$; −16 inches $H_2O$ to −5 inches $H_2O$; −15 inches $H_2O$ to 5 inches $H_2O$. As discussed hereinabove, superheated steam exiting steam superheater 501B can be introduced into the mixing apparatus 300 via one or more superheated steam lines 550.

Reformer flue gas and reformer effluent steam generator 501A may, as known in the art, be associated with one or more blowdown drums 515 configured to purge water off and control the solids level within reformer flue gas and reformer effluent steam generator 501A.

Description of a suitable steam generation apparatus according to another embodiment of this disclosure will now be made with reference to FIG. 3. In the embodiment of FIG. 3, the steam generation apparatus 500B comprises flue gas steam generator 501A" and reformer effluent steam generator 501A'. In the embodiment of FIG. 3, 'hot' reformer effluent process gas exiting reformer 400B via reformer process gas outlet lines 480 passes through reformer effluent steam generator 501A', configured for transfer of heat from the 'hot' reformer process gas to BFW introduced thereto via BFW inlet line 580. 'Cool' process gas exiting reformer effluent steam generator 501A' via steam generator process gas outlet line 450 may have a temperature in the range of from about 752° F. (400° C.) to about 1472° F. (800° C.), from about 752° F. (400° C.) to about 1112° F. (600° C.) or about 752° F. (400° C.) and/or a pressure in the range of from about 5 psig (34.5 kPa) to about 50 psig (344.7 kPa), from about 10 psig (68.9 kPa) to about 40 psig (275.8 kPa) or from about 20 psig (137.9 kPa) to about 30 psig (206.8 kPa).

Reformer flue gas outlet line(s) 470 may fluidly connect reformer 400B with steam superheater 501B'. As discussed in regard to FIG. 2, steam superheater 501B' is configured to produce superheated steam having a temperature in the range of from about 400° F. (204.4° C.) to about 1000° F. (537.8° C.), from about 600° F. (315.6° C.) to about 950° F. (510° C.) or from about 900° F. (482.2° C.) and/or a pressure in the range of from about 150 psig (1034.2 kPa) to about 400 psig (2757.9 kPa), from about 200 psig (1379 kPa) to about 375 psig (2585.5 kPa) or from about 250 psig (1723.7 kPa) to about 350 psig (2413.2 kPa). One or more superheated steam lines 550 are configured to carry the superheated steam from steam superheater 501B' to mixing vessel(s) 310C. The 'warm' flue gas exiting steam superheater 501B' has a temperature in the range of from about 1350° F. (732.2° C.) to about 2050° F. (1121.1° C.), from about 1450° F. (787.8° C.) to about 1950° F. (1065.6° C.) or about 1850° F. (1010° C.) and/or a pressure in the range of from about −20 inches $H_2O$ to 0 inch $H_2O$; −16 inches $H_2O$ to −5 inches $H_2O$; −15 inches $H_2O$ to 5 inches $H_2O$ and passes through flue gas steam generator 501A", configured for transferring heat from the 'warm' reformer flue gas to the steam in line

580A. One or more lines 560 are configured to carry saturated steam exiting flue gas steam generator 501A".

One or more steam generator flue gas outlet lines 570 are configured to carry 'cool' flue gas from flue gas steam generator 501A". As mentioned hereinabove, the 'cool' flue gas exiting flue gas steam generator 501A" can have a temperature in the range of from about 50° F. (10° C.) to about 400° F. (204.4° C.), from about 200° F. (93.3° C.) to about 400° F. (204.4° C.) or about 400° F. (204.4° C.) and/or a pressure in the range of from about −20 inches $H_2O$ to about 20 inches $H_2O$; from about −16 inches to about 20 inches $H_2O$; or from about −15 inches $H_2O$ to about −10 inches $H_2O$. As discussed with regard to FIG. 2, the 'cool' flue gas in steam generator flue gas outlet line 570 may be used to heat combustion air in combustion air preheater 413. Combustion air preheater 413 may be configured to heat air introduced thereto via FD fan 406 and one or more air inlet lines 405 from a first lower temperature (e.g. ambient temperature) to a second higher temperature in the range of from about 38° C. (100° F.) to about 399° C. (750° F.), from about 316° C. (600° F.) to about 399° C. (750° F.) or about 399° C. (750° F.) for introduction into the reformer burner (s). 'Cold' flue gas exiting air preheater 413 may have a temperature in the range of from about −18° C. (0° F.) to about 399° C. (750° F.), from about 38° C. (100° F.) to about 399° C. (750° F.) or from about 316° C. (600° F.) to about 399° C. (750° F.) and/or a pressure in the range of from about −20 inches $H_2O$ to about 20 inches $H_2O$; from about −16 inches to about 20 inches $H_2O$; or from about −15 inches $H_2O$ to about −10 inches $H_2O$. The 'cold' flue gas may be utilized elsewhere in the refinery, for example, in a dryer air heater of a feed handling and/or drying apparatus, as further discussed hereinbelow.

It will be apparent to those of skill in the art that flue gas steam generator 501A" and reformer effluent steam generator 501A' of the embodiment of FIG. 3 may be combined within a single vessel as indicated in the embodiment of FIG. 2.

Feed Handling and Drying Apparatus 200. A system of this disclosure may further comprise feed handling and/or drying apparatus configured to provide feed material of a desired average particle size, composition and/or moisture content to the downstream mixing apparatus. In embodiments, the feed handling and/or drying apparatus is substantially as disclosed in U.S. Pat. No. 7,375,142, the disclosure of which is hereby incorporated herein in its entirety for all purposes not contrary to this disclosure.

Suitable feed handling and/or drying apparatus can comprise an unloading and tramp metal removal zone I, a comminuting zone II, a drying zone III, a reformer feed hopper zone IV, or some combination of two or more thereof. A feed handling and/or drying apparatus will now be described with reference to FIG. 4, which is a schematic of a feeding and drying apparatus 200A according to an embodiment of this disclosure. Feed handling and/or drying apparatus 200A comprises unloading and tramp metal removal zone I configured for unloading of feed material and removal of undesirables therefrom. Unloading and tramp removal zone I can comprise a truck unloading hopper 205 into which delivered feed material is deposited. Truck unloading hopper 205 may be associated with a tramp metal detector 204 configured to determine the presence or absence of undesirables such as metals in the feed material. Unloading and tramp removal zone I can further comprise a conveyor 203 configured to convey feed material onto a weigh belt feeder 206. A tramp metal separator 207 is configured to remove tramp metal and other undesirables from the feed material introduced thereto. Removed undesirables can be introduced via line 208 into and stored in a bin 209 for disposal.

Figure 4:
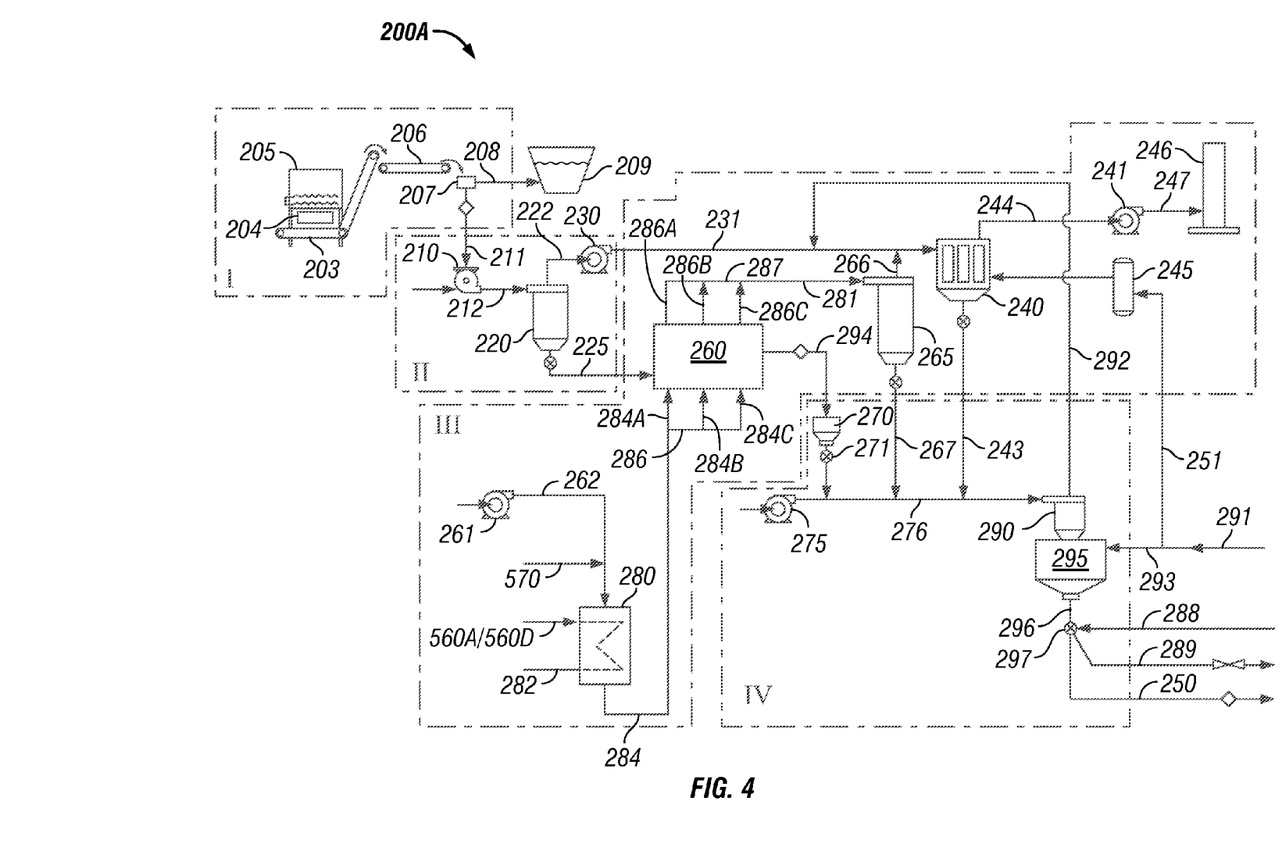
FIG. 4 is schematic of a feedstock handling and/or drying apparatus according to an embodiment of this disclosure.

Comminuting zone II can be positioned downstream of unloading and tramp removal zone I, as indicated in FIG. 4, or can be downstream of an unloading zone (i.e. in the absence of a tramp removal zone). Comminuting zone II comprises apparatus configured to comminute the feed material. In embodiments, the comminuting zone comprises at least one grinder 210. A comminuting zone II may be used depending on the consistency of the feedstock. In embodiments, the feedstock is primarily wood and/or other organic material. Grinder 210 may be used if the feedstock is clumped together, in unusually large conglomerates, or if the feedstock needs to be further ground before being dried. After the feedstock is optionally subjected to grinding, the ground material may be passed via grinder outlet line 212 into one or more grinder discharge cyclones 220 configured to separate a larger average size fraction of feed material from a smaller sized fraction. The larger sized fraction may be introduced via one or more grinder discharge cyclone outlet lines 225 into one or more dryers 260 of dryer zone III configured to reduce the moisture content of the material fed thereto. The smaller sized fraction from grinder discharge cyclone 220 may be passed via grinder discharge fines outlet line 222 and grinder discharge blower 230 into a dryer baghouse 240 of drying zone III, as further discussed hereinbelow. Drying zone III comprises at least one dryer 260 configured to reduce the moisture content of feed material introduced therein. In the embodiment of FIG. 4, drying zone III comprises dryer 260, dryer air heater 280, dryer cyclone 265, dryer baghouse 240, accumulator 245, dryer exhaust fan 241 and dryer stack 246. Various embodiments may comprise any combination of these components. Within drying zone III, the feedstock is dried to a moisture content in the range of from about 4% to about 20%, from about 5% to about 15% or from about 9% to about 15%. The flue gas and air fed into dryer 260 mixes with comminuted feedstock to dry it, purge it and heat it for further processing.

An air supply fan 261 is configured to introduce air via line 262 and reformer flue gas (e.g. 'cold' reformer flue gas from air preheater 413) via line 570 into dryer air heater 280. The flue gas may be added upstream of dryer air preheater 280 to prevent above 400° F. (204.4° C.) to the inlet of dryer 260, preventing fire therein. As mentioned hereinabove, the 'cold' flue gas may have a temperature in the range of from about −18° C. (0° F.) to about 399° C. (750° F.), from about 38° C. (100° F.) to about 399° C. (750° F.) or from about 316° C. (600° F.) to about 399° C. (750° F.) and/or a pressure in the range of from about −20 inches $H_2O$ to about 20 inches $H_2O$; from about −16 inches to about 20 inches $H_2O$; or from about −15 inches $H_2O$ to about −10 inches $H_2O$. In embodiments, the flue gas introduced via line 570 comprises about 80% nitrogen and 20% $CO_2$.

A portion of the effluent steam from reformer effluent and reformer flue gas steam generator 501A or from flue gas steam generator 501A" can be introduced via line 560A or 560D into dryer air preheater 280. The steam introduced into dryer air preheater 280 may have a temperature in the range of from about 150° F. (65.6° C.) to about 500° F. (260° C.), from about 250° F. (121.1° C.) to about 450° F. (232.2° C.) or from about 300° F. (148.9° C.) to about 400° F. (204.4° C.) and/or a pressure in the range of from about 70 psig (482.6 kPa) to about 300 psig (2068.4 kPa), from about 150 psig (1034.2 kPa) to about 300 psig (2068.4 kPa) or from about 250 psig (1723.7 kPa) to about 300 psig (2068.4 kPa). Condensate outlet line 282 is configured for removal of condensate from air dryer 280. The pressure of the condensate may be reduced downstream of the air dryer 280 and the condensate combined as indicated in FIG. 3 with condensate from excess steam condenser 516. Heated air exiting dryer air heater 280 via heated air line 284 may have a temperature in the range of from about −18° C. (0° F.) to about 204° C. (400° F.), from about −18° C. (0° F.) to about 149° C. (300° F.) or from about −18° C. (0° F.) to about 93.3° C. (200° F.). Desirably, the heated air temperature does not exceed 400° F.

Heated air line 284 fluidly connects dryer air heater 280 with dryer 260. Drying zone III may further comprise a heated air distributor 286 configured to divide heated air line 284 into a plurality of heated air dryer inlet lines. For example, in the embodiment of FIG. 4, distributor 286 divides the flow of air from heated air line 284 into three heated air dryer inlet lines 284A-284C. Air passing through dryer 260 may comprise entrained feed material. Accordingly, drying zone III can comprise one or more dryer cyclones 265 configured to separate solids from the air exiting dryer 260. In the embodiment of FIG. 4, air exiting dryer 260 via dryer vent lines 286A-286C is combined via air manifold 287 into dryer vent line 281 which is fed into dryer cyclone 265. It is to be noted that, although three air inlet and air outlet (vent) lines are shown in the embodiment of FIG. 4, any number of air inlet lines and outlet lines may be utilized. Additionally, the number of air inlet lines to dryer 260 need not be equal to the number of air outlet or vent lines.

Dryer cyclone 265 is configured to remove solids from the vent gas exiting dryer 260. Air and any fines entrained therein exit dryer cyclone 265 via dryer cyclone fines outlet line 266, while solids exit dryer cyclone 265 via dryer cyclone solids outlet line 267. Line 267 may be fluidly connected with reformer feed hopper inlet line 276. Dryer cyclone fines outlet line 266 may be configured to introduce air and entrained fines into dryer baghouse 240 along with fines introduced thereto from grinder discharge cyclone 220, grinder discharge cyclone outlet line 222, grinder discharge blower 230 and/or grinder discharge blower outlet line 231. In embodiments, dryer cyclone 265 is configured to provide solids having a particle size of greater than 3/32" (2.5 mm) or greater than 3/16" (4.8 mm) into dryer cyclone solids outlet line 267. In embodiments, dryer cyclone 265 is configured to separate solids having a particle size of less than 3/16" into dryer cyclone fines outlet line 266. In embodiments, dryer cyclone 265 has an efficiency of at least 85, 90, 92, 95, 96, 97, or 98 percent.

One or more dryer baghouses 240 are configured to remove solids from the air introduced thereto. One or more dryer baghouse solids outlet lines 243 are configured to introduce solids separated within dryer baghouse 240 into reformer feed hopper cyclone inlet line 276 of reformer feed hopper zone IV, further discussed hereinbelow. In embodiments, dryer baghouse 240 is configured to provide solids having a particle size of greater than 20, 15, 10 or 5 μm into dryer baghouse solids outlet line 243. In embodiments, dryer baghouse 240 is configured to separate solids having a particle size of less than 10 um into dryer baghouse fines outlet line 244.

One or more dryer baghouse fines outlet lines 244 are configured to introduce gas from dryer baghouse 240 into dryer stack 246, optionally via dryer exhaust fan 241 and line 247. A line 251 may introduce air into an accumulator 245 prior to introduction into dryer baghouse(s) 240.

Feed handling and/or drying apparatus 200A can further comprise a reformer feed hopper zone IV. The reformer feed hopper zone IV comprises at least one reformer feed hopper and a feeder configured for feeding feed material into mixing apparatus 300. In the embodiment of FIG. 4, reformer feed hopper zone IV comprises reformer feed hopper 295 and mixing vessel rotary feeder 297. Reformer feed hopper zone IV can further comprise a surge hopper 270, a reformer feed hopper blower 275 and a reformer feed hopper cyclone 290, as indicated in the embodiment of FIG. 4. One or more dried feed lines 294 are configured to introduce dried feed material from one or more dryers 260 of dryer zone III into reformer feed hopper zone IV. The feed material may be introduced into a surge hopper 270, configured for storage of surplus dried feed material and supply therefrom to reformer feed hopper 295. A reformer feed hopper blower 275 may be incorporated into zone IV for pushing dried feed material and/or separated solids introduced into reformer feed hopper cyclone inlet line 276 from dryer(s) 260 and/or surge hopper(s) 270 via line(s) 271, from dryer cyclone(s) 265 via dryer cyclone solids outlet line(s) 267, from dryer baghouse(s) 240 via dryer baghouse solids outlet line(s) 243 into reformer feed hopper cyclone(s) 290. In alternative embodiments, the material in reformer feed hopper inlet line(s) 276 is introduced directly into reformer feed hopper 295. Reformer feed hopper cyclone 290 is configured to separate fines from material introduced therein. In embodiments, a reformer feed hopper cyclone outlet line 292 is configured to introduce fines separated within reformer feed hopper cyclone 290 into dryer baghouse 240, optionally via grinder discharge blower outlet line 231 as indicated in the embodiment of FIG. 4. In embodiments, reformer feed hopper cyclone 290 is configured to provide solids having an average particle size in the range of from about 3.9E-5 inch (0.0001 cm) to about 1 inch (2.54 cm), from about 0.01 inch (0.0254 cm) to about 0.5 inch (1.27 cm) or from about 0.09 inch (0.24 cm) to about 0.2 inch (0.51 cm) into reformer feed hopper 295. In embodiments, the feed material in reformer feed hopper 295 is of a size allowing it to pass through a 4.8 millimeter (3/16 inch) screen. In embodiments, reformer feed hopper cyclone 290 is configured to separate solids having a particle size of less than 3/16" (0.48 cm) into reformer feed hopper cyclone fines outlet line 292. Feed material is introduced into reformer feed hopper 295 via reformer feed hopper inlet line 276 and optionally reformer feed hopper cyclone 290. In embodiments, reformer feed hopper 295 is a cylindrical vessel having a conical bottom. In embodiments, reformer feed hopper cyclone 295 provides an efficiency of at least 80, 85, 90, 92, 95, 96, 97 or 98 percent.

Mixing vessel rotary feeder 297 is configured to introduce feed material from reformer feed hopper 295 into mixing apparatus 300. As needed, feed material is fed from reformer feed hopper 295 and rotary feeder 297 into mixing apparatus 300. Rotary feeder 297 may be substantially as described in U.S. Pat. No. 7,375,142. Feed material exits reformer feed hopper 295 via feed hopper outlet line 296, which fluidly connects reformer feed hopper 295 with mixing vessel rotary feeder 297.

In embodiments, one or more purge lines 291 is configured to introduce purge gas (e.g. flue gas or plant air) for purge into and push feed material through reformer feed hopper 295. In embodiments, the purge gas is flue gas comprising about 80% nitrogen and about 20% carbon dioxide, helping to insure that the reformation process in reformer 400 will be carried out anaerobically. Reformer feed hopper 295 may also include a vent for venting flue gas. From reformer feed hopper 295, feedstock settles into feed hopper outlet line(s) 296, which extends from the bottom of reformer feed hopper 295. The feedstock is metered by rotary valve 297 into feedstock inlet line 250, along which it is entrained with steam under pressure entering from superheated steam line 550 of mixing apparatus 300. To keep feedstock flowing into the stream of steam, and in order to counter steam back pressure in line 250, a supply of gas is moved through rotary feeder purge gas inlet line 288 via a compressor to an inlet just below valve 297. To prevent the pressure in feedstock inlet line 250 from blowing feedstock back into rotary valve 297, some of the gas is also split off from rotary feeder purge gas inlet line 288 and fed to an inlet of mixing vessel rotary feeder 297. Rotary feeder 297 includes a central rotor having a plurality of vanes which divide the interior of valve 297 into separate compartments. Opposite the inlet on rotary valve 297, is an outlet pressure vent line 289. As the rotor of valve 297 rotates, the compartment formed by the vanes at the top fill with feedstock. That filled compartment is then rotated until it opens to the inlet, where it is pressurized with incoming gas. As the rotor rotates further, the feedstock filled and pressurized chamber opens into reformer feedstock inlet line 250. Since the pressure in the rotor chamber is equalized with the pressure in line 250, the feedstock falls down into feedstock inlet line 250. As the valve rotor continues on its journey, it is eventually vented through outlet pressure vent line 289, such that when the chamber again reaches feed hopper outlet line 296, it is depressurized and will not vent back up into feed hopper outlet line 296. After feedstock has moved through rotary feeder valve 297 and into feedstock line 250, it feeds by gravity into a mixing chamber or position along mixing apparatus feedstock inlet line 250 where the feedstock is mixed with superheated steam (e.g. steam having a temperature of about 510° C. (950° F.)) from superheated steam line 550.

Figure 5:
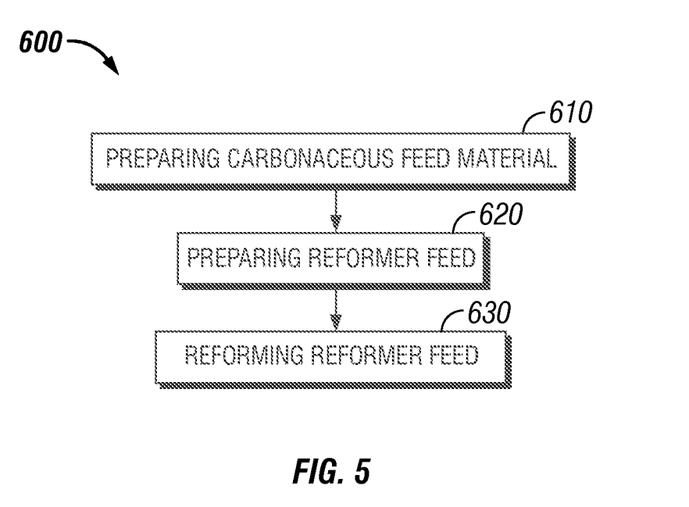
FIG. 5 is a flow diagram of a method of producing synthesis gas according to an embodiment of this disclosure.

II. Method of Producing Synthesis Gas. Also disclosed herein is a method of producing synthesis gas via reforming of carbonaceous material. In embodiments, the carbonaceous material comprises primarily biomass. The basic steps in the method of producing synthesis gas according to this disclosure are depicted in the flow diagram of FIG. 5. As indicated in FIG. 5, a method of producing synthesis gas conversion product 600 comprises preparing carbonaceous feedstock at 610, preparing reformer feed at 620 and reforming the reformer feed at 630. Preparing carbonaceous feed material 610 comprises comminuting and/or drying a suitable carbonaceous feed material. In embodiments, the source of the carbonaceous feedstock comprises biomass. In embodiments, the carbonaceous feedstock comprises at least one component that is or that is derived from lignite, coal, red cedar, southern pine, hardwoods such as oak, cedar, maple and ash, bagasse, rice hulls, rice straw, weeds such as kennaf, sewer sludge, motor oil, oil shale, creosote, pyrolysis oil such as from tire pyrolysis plants, used railroad ties, dried distiller grains, corn stalks and cobs, animal excrement, straw, and combinations thereof.

Preparing Carbonaceous Feedstock 610. In embodiments, preparing the carbonaceous feedstock 610 comprises sizing (comminuting) at least one carbonaceous feedstock such that it is of a desirable size for effective reforming. In embodiments, preparing the carbonaceous feedstock comprises reducing the average particle size of the feedstock to less than about $5/8^{th}$ inch (15.9 mm), ½ inch (12.7 mm), or less than about $3/16^{th}$ of an inch (4.8 mm). The carbonaceous feedstock may be sized by any methods known in the art. In embodiments, a carbonaceous material is sized by introducing it into one or more grinders 210, as discussed above with reference to FIG. 4.

In embodiments, preparing the carbonaceous feed material comprises drying the carbonaceous feedstock to a moisture content in the range of from about 4 weight percent to about 20 weight percent, from about 6 weight percent to about 16 weight percent, or from about 12 weight percent to about 18 weight percent. In embodiments, preparing the carbonaceous feed material comprises drying the carbonaceous feedstock to a moisture content in the range of from about 4 weight percent to about 20 weight percent, from about 5 weight percent to about 20 weight percent, from about 10 weight percent to about 20 weight percent or from about 5 weight percent to about 18 weight percent. In embodiments, preparing the carbonaceous feedstock comprises drying the carbonaceous feedstock to a moisture content of less than about 25, 20, 15, 10 or 9 weight percent. The carbonaceous feedstock may be dried by any methods known in the art. In embodiments, a carbonaceous feedstock is dried by introducing it into one or more dryers 260, as discussed above with reference to FIG. 4. In embodiments, ground carbonaceous material exiting grinder 210 is introduced into a grinder discharge cyclone 220. Within grinder discharge cyclone 220, a stream of larger sized particles is separated via grinder discharge cyclone outlet line 225 from a stream of smaller sized particles in grinder discharge fines outlet line 222. A grinder discharge blower 230 may introduce the smaller particles separated in grinder discharge cyclone 220 into one or more dryer baghouse(s) 240. The larger particles exiting grinder discharge cyclone 220 via grinder discharge cyclone outlet line 225 are introduced into dryer 260.

In embodiments, air supplied via air supply fan 261 and line 262 is combined with flue gas in line 570 and introduced into dryer air heater 280. The flue gas utilized here may be produced during reforming of the carbonaceous material discussed below. Heat transfer with steam introduced into the dryer air heater via steam inlet line 560A/560D produces heated air in heated air line 284 and condensate in condensate outlet line 282. As discussed hereinabove, the steam utilized in dryer air heater 280 may be produced via heat transfer with the hot reformer process gas effluent and/or the 'warm' flue gas effluent, as discussed further hereinbelow.

Heated air in heated air line 284 may be divided by a heated air distributor or divider 286 into a plurality of heated air inlet lines 284A-284C. Within dryer 260, the comminuted carbonaceous material is dried to a desired moisture content, as mentioned hereinabove. Dryer effluent comprising air and fines is introduced via dryer vent line 281 into dryer cyclone 265. Dried carbonaceous material exits dryer 260 via one or more dried feed lines 294 and surge hopper 270. Air from reformer feed hopper blower 275 may push comminuted and dried feed material from dryer 260 and surge hopper 270 along reformer feed hopper inlet line 276 into reformer feed hopper cyclone 290. Solids removed from dryer cyclone 265 and dryer baghouse 240 may be introduced into reformer feed hopper inlet line 276, as indicated in FIG. 4.

Gas exiting dryer cyclone 265 may be combined in grinder discharge blower outlet line 231 via dryer cyclone fines outlet line 266 with gas exiting grinder discharge blower 230 and gas exiting reformer feed hopper cyclone 290 via line 292 and introduced into dryer baghouse 240. Gases exiting dryer baghouse via dryer baghouse fines outlet line 244 may pass via dryer exhaust fan 241 and line 247 to dryer stack 246.

Dried carbonaceous materials exit reformer feed hopper cyclone 290 and enter reformer feed hopper 295. Carbonaceous material from reformer feed hopper 295 is introduced via mixing vessel rotary feeder 297 and feedstock line 250 into one or more mixing vessels of mixing apparatus 300.

Preparing Reformer Feed 620. As discussed above, producing synthesis gas via reforming of carbonaceous material 600 further comprises preparing reformer feed 620. A suitable reformer feed may be formed via combination of superheated steam and comminuted and dried carbonaceous material via any methods known in the art. In embodiments, spent catalyst comprising spent catalyst and associated synthesis gas conversion product is combined with the carbonaceous material prior to or along with combination with superheated steam. In embodiments, preparing reformer feed comprises introducing the comminuted and dried carbonaceous feed material and superheated steam into one or more mixing vessels as described hereinabove.

With reference to FIG. 2, preparing reformer feed material can comprise introducing comminuted and dried feed material via lines 250, 250A and 250B into mixing apparatus 300A. Spent catalyst/conversion product from a catalytic synthesis gas conversion process may be combined with the carbonaceous material via line 755. In alternative embodiments, spent catalyst/conversion product is introduced directly into the mixing vessel(s). Superheated steam from steam superheater 501B is introduced via superheated steam lines 550, 550A and 550B into mixers 310A and 310B, respectively.

With reference to FIG. 3, preparing reformer feed 620 can comprise introducing comminuted and dried feed material via feedstock inlet line 250 into mixing apparatus 300B. Superheated steam from steam superheater 501B' is introduced via superheated steam line 550 into mixer 310C.

As mentioned hereinabove, within the mixing apparatus, superheated steam and carbonaceous material are combined to provide a reformer feed mixture comprising from about 0.14 kilograms (0.3 pounds) to about 0.32 kilograms (0.7 pounds), from about 0.14 kg (0.3 pounds) to about 0.23 kg (0.5 pounds) or from about 0.14 kg (0.3 pounds) to about 0.18 kg (0.4 pounds) of steam per pound of 'dry' feedstock comprising from about 4% to about 20% moisture by weight, from about 9% to about 18% moisture or from about 10% to about 20% moisture, to provide the reformer feed mixture that is introduced into the coiled tubes of the reformer. In embodiments, the reformer feed comprises from about 0.01 wt % to about 20 wt %, from about 0.05 wt % to about 10 wt %, or from 1 wt % to about 5 wt % weight percent spent catalyst/product (e.g. cat/wax). The reformer feed may have a temperature in the range of from about 150° F. (66° C.) to about 1000° F. (538° C.), from about 200° F. (93° C.) to about 750° F. (399° C.), or from about 300° F. (149° C.) to about 400° F. (204° C.). In embodiments, the reformer feed has a pressure of at least or about in the range of from about 34.5 kPa (5 psig) to about 275 kPa (40 psig).

The superheated steam utilized in the reformer feed mixers may be produced by heat exchange with the reformer flue gas effluent and/or the reformer process gas effluent. With reference to FIG. 2, BFW may be introduced via BFW inlet line(s) 580 into reformer effluent and reformer flue gas steam generator 501A. Within reformer effluent and reformer flue gas steam generator 501A, heat transfer between the hot gas ('warm' reformer flue gas passing through steam superheater 501B and 'hot' reformer process gas effluent) and the BFW may produce steam (in steam outlet line 560) having a temperature in the range of from about 300° F. (148.9° C.) to about 500° F. (260° C.), from about 350° F. (176.7° C.) to about 500° F. (260° C.) or from about 350° F. (176.7° C.) to about 500° F. (260° C.) and a pressure in the range of from about 200 psig (1379 kPa) to about 300 psig (2068.4 kPa), from about 250 psig (1723.7 kPa) to about 300 psig (2068.4 kPa), or from about 275 psig (1896.1 kPa) to about 300 psig (2068.4 kPa). Steam exiting reformer effluent and reformer flue gas steam generator 501A via steam generator steam outlet line 560 may be divided, with a portion entering steam superheater 501B via line 560B and another portion exported via line 560A. Within steam superheater 501B, heat transfer between 'hot' reformer flue gas and steam produces superheated steam having a temperature in the range of from about 400° F. (204.4° C.) to about 1000° F. (537.8° C.), from about 600° F. (315.6° C.) to about 950° F. (510° C.) or from about 400° F. (204.4° C.) to about 900° F. (482.2° C.) and/or a pressure in the range of from about 150 psig (1034.2 kPa) to about 400 psig (2757.9 kPa), from about 200 psig (1379 kPa) to about 375 psig (2585.5 kPa) or from about 250 psig (1723.7 kPa) to about 350 psig (2413.2 kPa). The superheated steam exiting steam superheater 501B is introduced into reformer feed mixing vessels 310A/310B via lines 550 and 550A/550B.

With reference to FIG. 3, BFW may be introduced via BFW inlet line 580 into reformer effluent steam generator 501A'. Within reformer effluent steam generator 501A', heat transfer between the hot process gas effluent and the BFW may produce steam. Steam exiting reformer effluent steam generator 501A' via line 580A may be introduced into flue gas steam generator 501A". Within flue gas steam generator 501A", heat transfer between 'warm' reformer flue gas and steam produces saturated steam (exiting via steam generator steam outlet line 560) having a temperature in the range of from about 300° F. (148.9° C.) to about 500° F. (260° C.), from about 350° F. (176.7° C.) to about 500° F. (260° C.) or from about 350° F. (176.7° C.) to about 500° F. (260° C.) and a pressure in the range of from about 200 psig (1379 kPa) to about 300 psig (2068.4 kPa), from about 250 psig (1723.7 kPa) to about 300 psig (2068.4 kPa), or from about 275 psig (1896.1 kPa) to about 300 psig (2068.4 kPa).

Reformer flue gas exiting the reformer via reformer flue gas outlet line 470 passes through steam superheater 501B', wherein the temperature of the 'hot' flue gas is reduced to a temperature in the range of from about 530° F. (276.7° C.) to about 1500° F. (815.6° C.), from about 530° F. (276.7° C.) to about 1200° F. (648.9° C.) or about 530° F. (276.7° C.) and/or a pressure in the range of from about −20 inches $H_2O$ to 0 inch $H_2O$; from about −15 inch $H_2O$ to about −5 inch $H_2O$; or from about −10 inches $H_2O$ to about −5 inches $H_2O$ and superheated steam is produced. The superheated steam may have a temperature in the range of from about 400° F. (204.4° C.) to about 1000° F. (537.8° C.), from about 600° F. (315.6° C.) to about 950° F. (510° C.) or from about 400° F. (204.4° C.) to about 900° F. (482.2° C.) and/or a pressure in the range of from about 150 psig (1034.2 kPa) to about 400 psig (2757.9 kPa), from about 200 psig (1379 kPa) to about 375 psig (2585.5 kPa) or from about 250 psig (1723.7 kPa) to about 350 psig (2413.2 kPa). The superheated steam exiting steam superheater 501B' is introduced into reformer feed mixing vessel 310C via line 550.

Reforming Reformer Feed 630. As discussed above, producing synthesis gas via reforming of carbonaceous material 600 further comprises reforming reformer feed at 630. In embodiments, reforming the reformer feed 630 comprises converting the reformer feed into synthesis gas via introduction into a reformer as described above. Reforming of the synthesis gas will now be described with reference to FIGS. 2 and 3. Reformer feed is introduced into the reformer via one or more reformer feed inlet lines 350. In embodiments, a distributor 412 distributes the reformer feed evenly among a plurality of coiled tubes 410. Within the coiled tubes, reforming of the carbonaceous feedstock produces synthesis gas. In embodiments, the temperature of the reformer (e.g. reformer effluent) is maintained in the range of up to or about 926° C. (1700° F.), 982° C. (1800° F.), 1038° C. (1900° F.), 1093° C. (2000° F.), 1149° C. (2100° F.). In embodiments, the pressure of the reformer is maintained in the range of from about 0 psig (0 kPa) to about 100 psig (689.5 kPa), from about 2 psig (13.8 kPa) to about 60 psig (413.7 kPa) or from about 5 psig (34.5 kPa) to about 50 psig (344.7 kPa). In embodiments, the reformer pressure is maintained at a pressure of equal to or greater than about 2 psig (13.8 kPa), about 5 psig (34.5 kPa), or about 50 psig (344.7 kPa).

The heat needed to maintain the desired reformer temperature is provided to the endothermic reforming process by the combustion of fuel in one or more burners 404. Air for the combustion may be heated in air preheater 413 prior to burning with the fuel in burners 404. The fuel combusted in the burner(s) 404 may be selected from tailgas (e.g. Fischer-Tropsch tailgas), synthesis gas, methane (e.g. natural gas), and combinations thereof. Desirably, at least a portion of the fuel combusted in at least one of the burner(s) 404 comprises tailgas recycled from a synthesis gas conversion process. At least one of the burner(s) 404 may be specially designed for the combustion of tailgas or for the combustion of tailgas in combination with another gas, for example in combination with a as selected from synthesis gas and methane (e.g. natural gas). In embodiments, recycle tailgas in line(s) 770 is introduced into one or more burner(s) 404 by introduction into one or more of the fuel lines 406 or via another fuel inlet line(s).

The synthesis gas produced via this disclosure can be utilized for the production of a variety of products, such as, but not limited to, liquid Fischer-Tropsch hydrocarbons, alcohols and other oxidized compounds. As mentioned hereinabove, for any given feedstock, a desired composition of the resulting reformer product synthesis gas (i.e. the proportions of hydrogen, carbon dioxide, carbon monoxide and methane; the molar ratio of hydrogen to carbon monoxide) can be provided by adjusting the composition of the dried feedstock (i.e. the components and/or the moisture content therein), the contact time in the reformer, the temperature at the reformer outlet, ratio of steam to carbonaceous material in the reformer feedstock, the reformer pressure, or any combination of two or more thereof to provide a suitable synthesis gas for a desired downstream application.

In embodiments, the synthesis gas is to be utilized downstream for the production of liquid hydrocarbons via Fischer-Tropsch conversion. In embodiments, the synthesis gas is to be utilized downstream for the production of liquid hydrocarbons via Fischer-Tropsch conversion with an iron-based catalyst. In such embodiments, the system may be operated with a reformer exit temperature in the range of from about 898° C. (1650° F.) to about 926° C. (1700° F.) and a residence or contact time that is in the range of from about 0.3 seconds to about 2.0 seconds in the reformer. The contact or residence time can be calculated by dividing the internal volume of the reformer by the flow rate of the process gas exiting the reformer.

In embodiments, the reformer is configured to provide temperature, pressure and residence time conditions suitable to provide a process gas comprising synthesis gas having a desired molar ratio of $H_2$ to CO. In embodiments, the reformer is configured to provide a synthesis gas having a $H_2$:CO molar ratio in the range of from about 0.7:1 to about 2:1, from about 0.7:1 to about 1.5:1 or about 1:1. In embodiments, the reformer is configured to provide a residence time within the reformer in the range of from about 0.3 s to about 3 s, from about 0.3 s to about 2 s, from about 0.3 s to about 1 s, or from about 0.4 s to about 0.6 s.

While the preferred embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims.

The discussion of a reference is not an admission that it is prior art to the present invention, especially any reference that may have a publication date after the priority date of this application. The disclosures of all patents, patent applications, and publications cited herein are hereby incorporated herein by reference in their entirety, to the extent that they provide exemplary, procedural, or other details supplementary to those set forth herein.

What is claimed is:

1. A mixing apparatus for producing a feedstock for a reformer, the mixing apparatus comprising:
   at least one mixing vessel comprising:
      a cylindrical vessel with a conical bottom;
      a steam inlet configured for introducing steam into the conical bottom;
      a carbonaceous material inlet configured for introducing a carbonaceous feed into the cylindrical vessel;
      an outlet for a reformer feedstock, wherein the outlet is connected to a reformer; and
   a spent catalyst recycle line designed for introduction of spent catalyst from a catalytic synthesis gas conversion process directly into the at least one mixing vessel, or a spent catalyst recycle line designed for introduction of spent catalyst from a catalytic synthesis gas conversion process and fluidly connected to the carbonaceous material inlet, or both.

2. The mixing apparatus of claim 1 further comprising one or more mixing vessel outlet lines fluidly connected with the reformer via a distributor, whereby the reformer feedstock can be introduced into a plurality of coiled tubes within the reformer.

3. The mixing apparatus of claim 1 wherein the carbonaceous material inlet is located at or near the top of the cylindrical vessel.

4. The mixing apparatus of claim 1 wherein the at least one mixing vessel is configured for operation at a pressure of greater than or equal to about 45 psig.

5. The mixing apparatus of claim 1 further comprising one or more feed preparation apparatus upstream of the at least one mixing vessel.

6. The mixing apparatus of claim 5 wherein the one or more feed preparation apparatus comprises at least one component selected from the group consisting of sizing apparatus configured to provide a desired size of carbonaceous material for the carbonaceous feed, and drying apparatus configured to reduce the moisture content of a carbonaceous material for the carbonaceous feed.

7. The mixing apparatus of claim 6 comprising sizing apparatus configured to provide carbonaceous material having a desired size.

8. The mixing apparatus of claim 7 wherein the sizing apparatus is operable to provide carbonaceous material having a size in the range of from about 0.001 cm to about 2.54 cm.

9. The mixing apparatus of claim 7 wherein the sizing apparatus comprises at least one grinder and at least one separator configured to provide a carbonaceous material having an average particle diameter of less than about $3/16^{th}$ of an inch (0.47 cm).

10. The mixing apparatus of claim 6 comprising drying apparatus configured to reduce the moisture content of a carbonaceous material for the carbonaceous feed.

11. The mixing apparatus of claim 10 wherein the drying apparatus comprises a dryer operable to dry the carbonaceous material to a moisture content of less than or equal to about 20 weight percent.

12. The mixing apparatus of claim 1 wherein the steam inlet is fluidly connected with a steam superheater operable to provide superheated steam.

13. The mixing apparatus of claim 12 wherein the steam superheater is fluidly connected with the reformer, whereby a flue gas produced in the reformer can be utilized to produce superheated steam in the steam superheater.

14. The mixing apparatus of claim 13 wherein the reformer is designed to produce the flue gas via combustion of a fuel comprising Fischer-Tropsch tailgas.

15. The mixing apparatus of claim 1 wherein the spent catalyst recycle line is fluidly connected with a catalytic synthesis gas conversion apparatus configured to produce a product from synthesis gas produced in the reformer.

16. The mixing apparatus of claim 15 wherein the catalytic synthesis gas conversion apparatus comprises at least one Fischer-Tropsch reactor.

17. The mixing apparatus of claim 16 wherein the at least one Fischer-Tropsch reactor contains an iron-based Fischer-Tropsch catalyst, and wherein the spent catalyst comprises spent iron-based Fischer-Tropsch catalyst and Fischer-Tropsch hydrocarbons.

18. The mixing apparatus of claim 15 wherein the catalytic synthesis gas conversion apparatus comprises an alcohol synthesis reactor.

19. The mixing apparatus of claim 1 wherein the outlet for the reformer feedstock is located at or near a bottom of the at least one mixing vessel.

* * * * *